US008446822B2

(12) United States Patent
Bitar

(10) Patent No.: US 8,446,822 B2
(45) Date of Patent: *May 21, 2013

(54) PINNING AND PROTECTION ON LINK AGGREGATION GROUPS

(75) Inventor: Nabil N. Bitar, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/166,193

(22) Filed: Jun. 22, 2011

(65) Prior Publication Data

US 2011/0267941 A1  Nov. 3, 2011

Related U.S. Application Data

(63) Continuation of application No. 11/949,164, filed on Dec. 3, 2007, now Pat. No. 8,077,613.

(51) Int. Cl.
*H04L 12/28* (2006.01)
*H04J 3/16* (2006.01)

(52) U.S. Cl.
USPC .......................... 370/230; 370/431; 370/468

(58) Field of Classification Search
USPC ................. 370/229–231, 252, 431, 463–465, 370/468; 709/223, 225–229, 232, 235
See application file for complete search history.

(56) References Cited

U.S. PATENT DOCUMENTS

| 5,809,021 A | 9/1998 | Diaz et al. |
| 6,320,861 B1 | 11/2001 | Adam et al. |
| 7,345,991 B1 | 3/2008 | Shabtay et al. |
| 2004/0042479 A1 | 3/2004 | Epstein et al. |
| 2004/0228278 A1 | 11/2004 | Bruckman et al. |
| 2005/0135435 A1 | 6/2005 | Ishii |
| 2005/0271084 A1 | 12/2005 | Bruckman et al. |
| 2005/0276263 A1 | 12/2005 | Suetsugu et al. |
| 2006/0227704 A1 | 10/2006 | Nakagawa et al. |
| 2007/0086333 A1 | 4/2007 | Doukai et al. |
| 2007/0195773 A1 | 8/2007 | Tatar et al. |
| 2007/0237172 A1 | 10/2007 | Zelig et al. |
| 2007/0248082 A1 | 10/2007 | Nielsen |
| 2009/0003206 A1 | 1/2009 | Bitar |
| 2009/0073989 A1 | 3/2009 | Cai et al. |

FOREIGN PATENT DOCUMENTS

| CN | 1996925 A | 7/2007 |
| EP | 0910195 | 4/1999 |

*Primary Examiner* — Kerri Rose

(57) ABSTRACT

A device may assign a virtual local area network (VLAN) to one or more specific links in a link aggregation group (LAG), and send traffic from the VLAN on the assigned one or more specific LAG links. Traffic from the same VLAN may be sent on one link in the LAG by selecting a hashing criterion or by pinning the VLAN to a primary link in the LAG and another link for redundancy purposes.

20 Claims, 8 Drawing Sheets

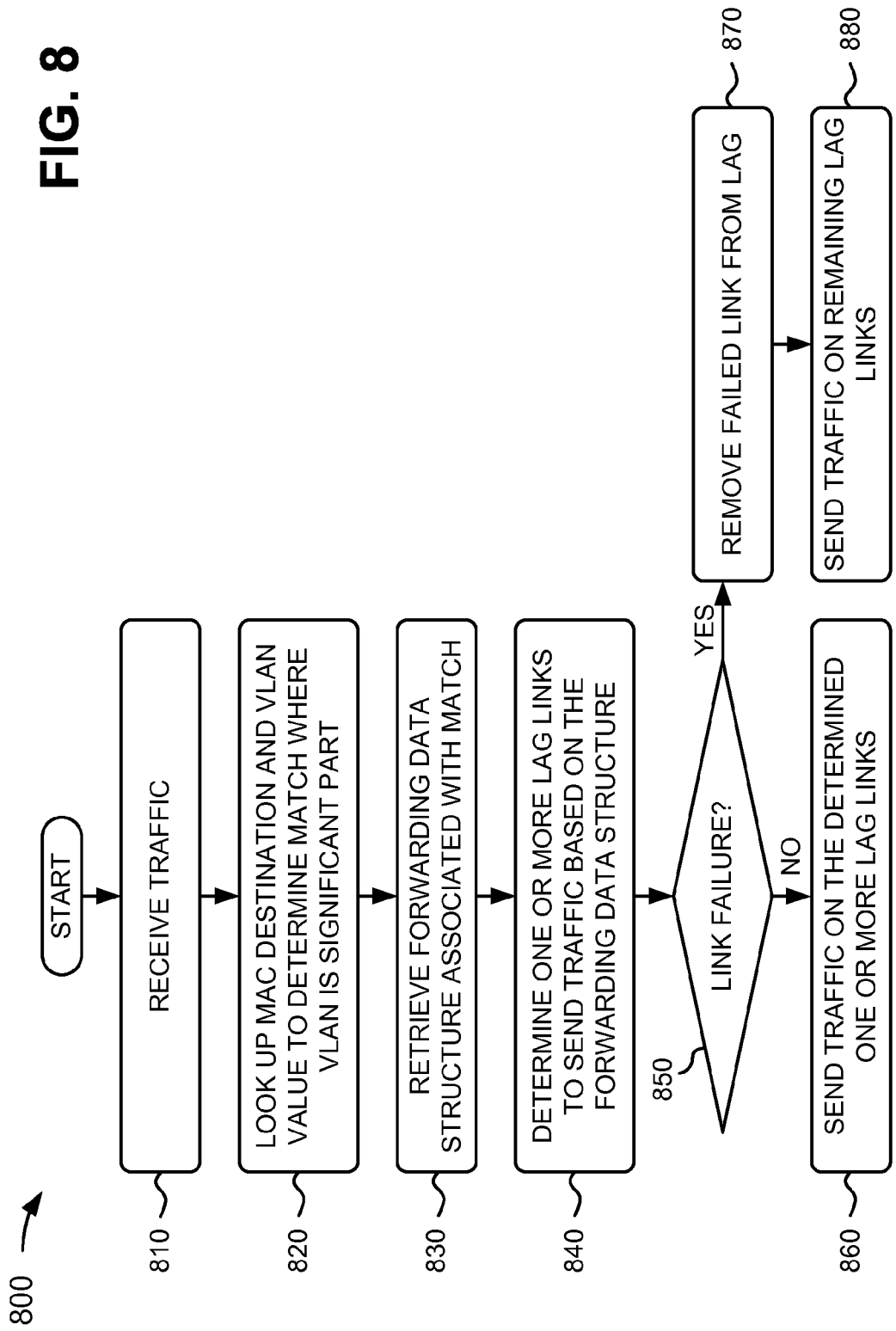

PINNING AND PROTECTION ON LINK AGGREGATION GROUPS

RELATED APPLICATION

This application is a continuation of U.S. patent application Ser. No. 11/949,164, filed Dec. 3, 2007, now U.S. Pat. No. 8,077,613, the disclosure of which is incorporated by reference herein in its entirety.

BACKGROUND INFORMATION

A link aggregation (e.g., as set forth in IEEE 802.3ad) is a computer networking term which describes using multiple links (e.g., Ethernet network cables and/or ports in parallel) as one logical port to increase the link speed beyond the limits of any one single link and/or to provide for link redundancy between two network elements. Other terms used for link aggregation may include link bonding, link bundling, and/or link aggregation group (LAG). LAG will be used hereinafter to refer to link aggregation. A LAG may be provisioned between a pair of network elements, either locally or virtually. A LAG in a network element may span ports in the same packet processing line card or across packet processing line cards, providing protection against processing line card failure.

A LAG permits two network elements interconnected by the LAG to communicate simultaneously over all member links in the LAG. Network datagrams may be dynamically distributed across member links in the LAG based on a local rule so that administration of what datagrams actually flow across a given port may be taken care of automatically with the LAG.

A LAG, as set forth in IEEE 802.3ad, allows one or more links to be aggregated together to form a LAG. Once implemented, the LAG can be configured and reconfigured quickly and automatically with no risk of duplication or rendering of frames, and with minimum packet loss.

A LAG may be used to provide load balancing across multiple parallel links between two network devices. One method of load balancing used today is based on Internet Protocol (IP) header source and destination addresses. Another method, which may be used for non-IP protocols carried in Ethernet frames, is based on media access control (MAC) source and destination addresses. In typical networks, the load may not be divided equally among the links of a LAG. The statistical nature of traffic distribution across parameters (e.g., IP addresses) used by typical hashing algorithms may result in overloading certain links in the LAG while underutilizing other links in the LAG.

A LAG may provide local link protection. Should one of the multiple member links used in a LAG fail, network traffic (e.g., datagrams) may be dynamically redirected to flow across the remaining surviving links in the LAG. A LAG may redirect traffic to a surviving link based on a hashing algorithm. However, there is no upfront prediction of what traffic gets redirected over which link, and it is not predictable what link in the LAG may fail. In point-to-point Ethernet applications where a virtual local area network (VLAN) identifier (ID) is used to identify a connection between two edge Ethernet switches, the hashing can be made on the VLAN and/or other Ethernet header and/or payload information (e.g., IP header information if the Ethernet payload contains an IP packet). This may make it difficult to predict a load on a given link in the LAG, and may make it difficult to efficiently and predictably design an Ethernet network that provides packet-loss and bandwidth service level agreement (SLA) guarantees for point-to-point services. Point-to-point services known as ELine (Ethernet Private Line (EPL) or Ethernet Virtual Private Line (EVPL)) may be the most stringent services in terms of SLAs.

BRIEF DESCRIPTION OF THE DRAWINGS

FIGS. 6-8 depict flowcharts of exemplary processes for a network and/or a network device of FIG. 1 according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may guarantee SLAs for point-to-point services in the presence of multi-point services on a link aggregation group (LAG). In one implementation, the systems and methods may ensure that point-to-point services may share a LAG with multi-point traffic while still guaranteeing that the point-to-point services have a predictable behavior. In other implementations, the systems and methods may allocate corresponding point-to-point connections to queues on a link of the LAG via a management mechanism and/or via signaling. For example, it is desirable to be able to predictably place a VLAN on a link and redundant link for protection purposes in a way that ensures that either link satisfies a VLAN bandwidth requirement. In addition to guaranteeing that the VLAN bandwidth is satisfied, ensuring that traffic from the same VLAN may follow a same path is desired for VLAN liveliness checks.

Figure 1:
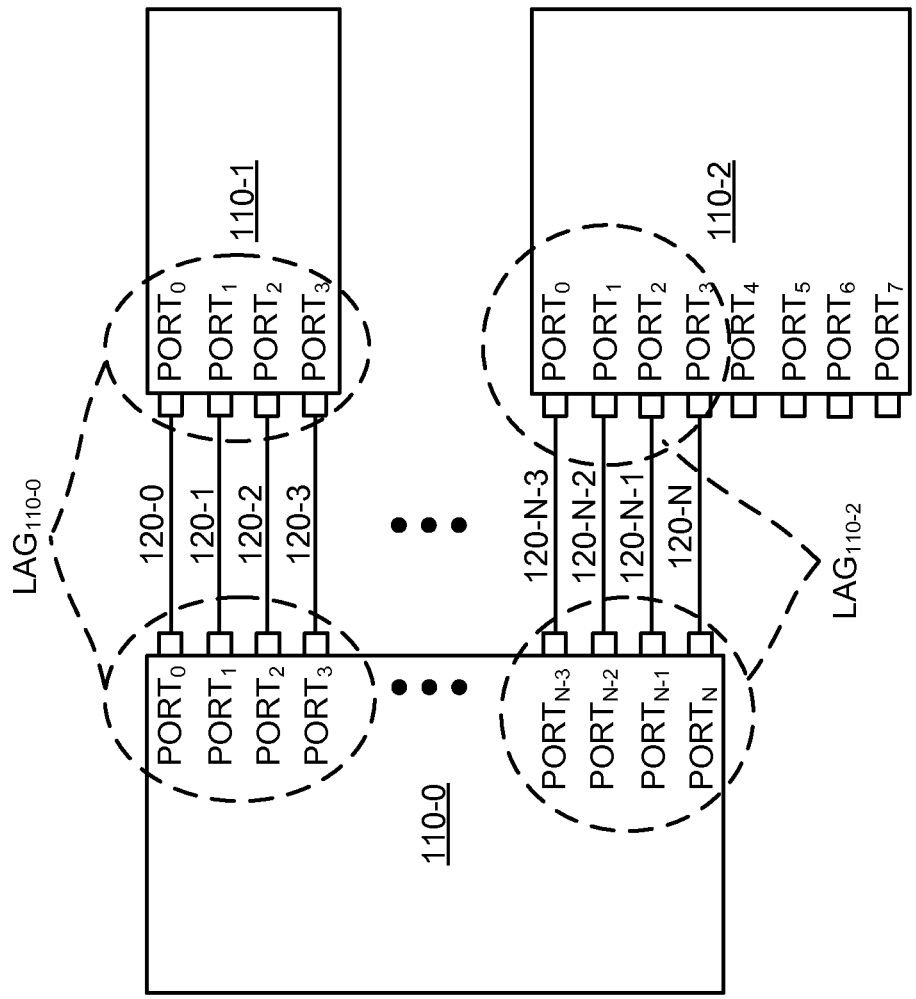
FIG. 1 is an exemplary diagram of a network in which systems and methods described herein may be implemented.

FIG. 1 is a diagram illustrating an exemplary network 100 in which systems and methods described herein may be implemented. Network 100 may include, for example, a local area network (LAN), a private network (e.g., a company intranet), a wide area network (WAN), a metropolitan area network (MAN), or another type of network. In one implementation, network 100 may include a switched network that provides point-to-point and multi-point services, a network capable of using a VLAN, etc.

As shown in FIG. 1, network 100 may include network devices 110-0, 110-1 and 110-2 (collectively referred to as network devices 110) interconnected by links 120-0, . . . , 120-N (collectively referred to as links 120). While three network devices 110 and eight links 120 are shown in FIG. 1, more or fewer network devices 110 and/or links 120 may be used in other implementations.

Network device 110 may include a variety of devices. For example, network device 110 may include a computer, a router, a switch, a network interface card (NIC), a hub, a bridge, etc. Links 120 may include a path that permits communication among network devices 110, such as wired connections, input ports, output ports, etc. For example, network device 110-0 may include ports $PORT_0, PORT_1, \ldots, PORT_N$, network device 110-1 may include ports $PORT_0, PORT_1, PORT_2, PORT_3$, and network device 110-2 may include ports $PORT_0, PORT_1, \ldots, PORT_7$. The ports of network devices 110 may be considered part of corresponding links 120 and may be either input ports, output ports, or combinations of input and output ports. While eight ports for network device 110-0, four ports for network device 110-1, and eight ports for network device 110-2 are shown in FIG. 1, more or fewer ports may be used in other implementations.

In an exemplary implementation, network devices 110 may provide entry and/or exit points for datagrams (e.g., traffic) in network 100. The ports (e.g., $PORT_0, \ldots,$ and $PORT_N$) of network device 110-0 may send and/or receive datagrams. The ports (e.g., $PORT_0, PORT_1, PORT_2,$ and $PORT_3$) of network device 110-1 and the ports (e.g., $PORT_0, \ldots,$ and $PORT_7$) of network device 110-2 may likewise send and/or receive datagrams.

In one implementation, a LAG may be established between network devices 110-0 and 110-1. For example, ports $PORT_0, \ldots,$ and $PORT_3$ of network device 110-0 may be grouped together into a $LAG_{110-0}$ that communicates bi-directionally with ports $PORT_0, PORT_1, PORT_2,$ and $PORT_3$ of network device 110-1, via links 120-0, 120-1, 120-2, and 120-3. Datagrams may be dynamically distributed between ports (e.g., $PORT_0, PORT_1, PORT_2,$ and $PORT_3$) of network device 110-0 and ports (e.g., $PORT_0, PORT_1, PORT_2,$ and $PORT_3$) of network device 110-1 so that administration of what datagrams actually flow across a given link (e.g., links 120-0, . . . , and 120-3) may be automatically handled by $LAG_{110-0}$.

In another implementation, a LAG may be established between network devices 110-0 and 110-2. For example, ports $PORT_{N-3}, \ldots,$ and $PORT_N$ of network device 110-0 may be grouped together into a $LAG_{110-2}$ that communicates bi-directionally with ports $PORT_0, PORT_1, PORT_2,$ and $PORT_3$ of network device 110-2, via links 120-N-3, 120-N-2, 120-N-1, and 120-N. Ports $PORT_0, PORT_1, PORT_2,$ and $PORT_3$ of network device 110-2 may be grouped together into $LAG_{110-2}$. $LAG_{110-2}$ may permit ports $PORT_{N-3}, \ldots,$ and $PORT_N$ of network device 110-0 and ports $PORT_0, PORT_1, PORT_2,$ and $PORT_3$ of network device 110-2 to communicate bi-directionally. Datagrams may be dynamically distributed between ports (e.g., $PORT_{N-3}, \ldots,$ and $PORT_N$) of network device 110-0 and ports (e.g., $PORT_0, PORT_1, PORT_2,$ and $PORT_3$) of network device 110-2 so that administration of what datagrams actually flow across a given link (e.g., links 120-N-3, . . . , and 120-N) may be automatically handled by $LAG_{110-2}$. With such an arrangement, network devices 110 may transmit and receive datagrams simultaneously on all links within a LAG established by network devices 110.

Although FIG. 1 shows exemplary components of network 100, in other implementations, network 100 may contain fewer, different, or additional components than depicted in FIG. 1. In still other implementations, one or more components of network 100 may perform the tasks performed by one or more other components of network 100.

Figure 2:
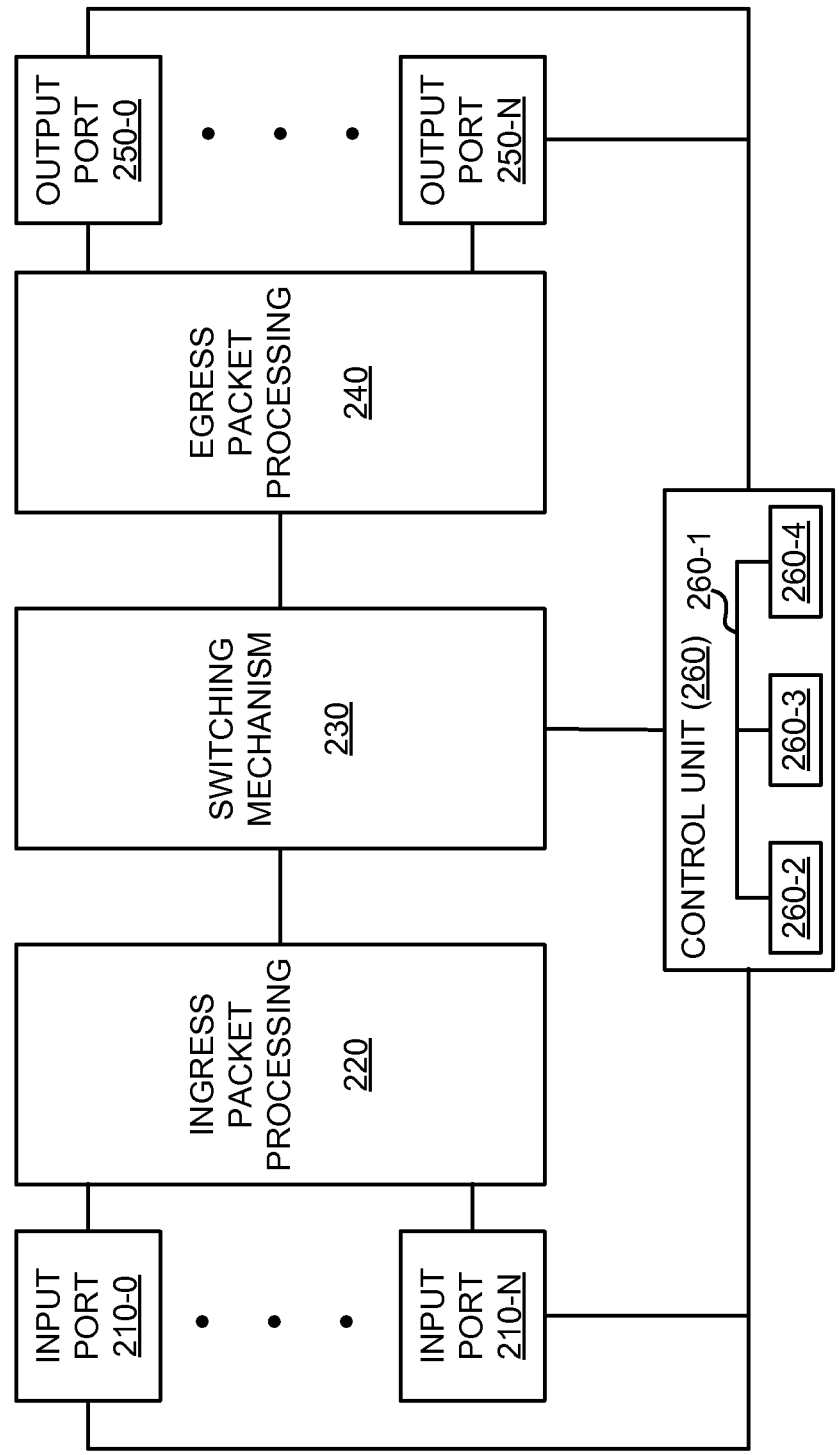
FIG. 2 is a diagram of an exemplary network device of FIG. 1.

FIG. 2 is an exemplary diagram of a device that may correspond to one of network devices 110 of FIG. 1. As illustrated, network device 110 may include input ports 210, an ingress packet processing block 220, a switching mechanism 230, an egress packet processing block 240, output ports 250, and a control unit 260. In one implementation, ingress packet processing block 220 and egress packet processing block 240 may be on the same line card.

Input ports 210 may be the point of attachment for a physical link (e.g., link 120) (not shown) and may be the point of entry for incoming datagrams. Ingress packet processing block 220 may store forwarding tables and may perform forwarding table lookup to determine to which egress packet processing and/or output port that a datagram may be forwarded. Switching mechanism 220 may interconnect ingress packet processing block 220 and egress packet processing block 240, as well as associated input ports 210 and output ports 250. Egress packet processing block 240 may store datagrams and may schedule datagrams for service on an output link (e.g., link 120) (not shown). Output ports 250 may be the point of attachment for a physical link (e.g., link 120) (not shown) and may be the point of exit for datagrams. Control unit 260 may run routing protocols and Ethernet control protocols, build forwarding tables and download them to ingress packet processing block 220 and/or egress packet processing block 240, etc.

Ingress packet processing block 220 may carry out data link layer encapsulation and decapsulation. In order to provide quality of service (QoS) guarantees, ingress packet processing block 220 may classify datagrams into predefined service classes. Input ports 210 may run data link-level protocols. In other implementations, input ports 210 may send (e.g., may be an exit point) and/or receive (e.g., may be an entry point) datagrams.

Switching mechanism 230 may be implemented using many different techniques. For example, switching mechanism 230 may include busses, crossbars, and/or shared memories. The simplest switching mechanism 230 may be a bus that links input ports 210 and output ports 250. A crossbar may provide multiple simultaneous data paths through switching mechanism 230. In a shared-memory switching mechanism 230, incoming datagrams may be stored in a shared memory and pointers to datagrams may be switched.

Egress packet processing block 240 may store datagrams before they are transmitted on an output link (e.g., link 120). Egress packet processing block 240 may include scheduling algorithms that support priorities and guarantees. Egress packet processing block 240 may support data link layer encapsulation and decapsulation, and/or a variety of higher-level protocols. In other implementations, output ports 230 may send (e.g., may be an exit point) and/or receive (e.g., may be an entry point) datagrams.

Control unit 260 may interconnect with input ports 210, ingress packet processing block 220, switching mechanism 230, egress packet processing block 240, and output ports 250. Control unit 260 may compute a forwarding table, implement routing protocols, and/or run software to configure and manage network device 110. In one implementation, control unit 260 may include a bus 260-1 that may include a path that permits communication among a processor 260-2, a memory 260-3, and a communication interface 260-4. Processor 260-2 may include a microprocessor or processing logic that may interpret and execute instructions. Memory 260-3 may include a random access memory (RAM), a read only memory (ROM) device, a magnetic and/or optical recording medium and its corresponding drive, and/or another type of static and/or dynamic storage device that may store information and instructions for execution by processor 260-2. Communication interface 260-3 may include any transceiver-like mechanism that enables control unit 260 to communicate with other devices and/or systems.

Network device 110 may perform certain operations, as described herein. Network device 110 may perform these operations in response to processor 260-2 executing software instructions contained in a computer-readable medium, such as memory 260-3. A computer-readable medium may be defined as a physical or logical memory device.

The software instructions may be read into memory 260-3 from another computer-readable medium, such as a data storage device, or from another device via communication interface 260-4. The software instructions contained in memory 260-3 may cause processor 260-2 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 110, in other implementations, network device 110 may contain fewer, different, or additional components than depicted in FIG. 2. In still other implementations, one or more components of network device 110 may perform the tasks performed by one or more other components of network device 110.

Figure 3:
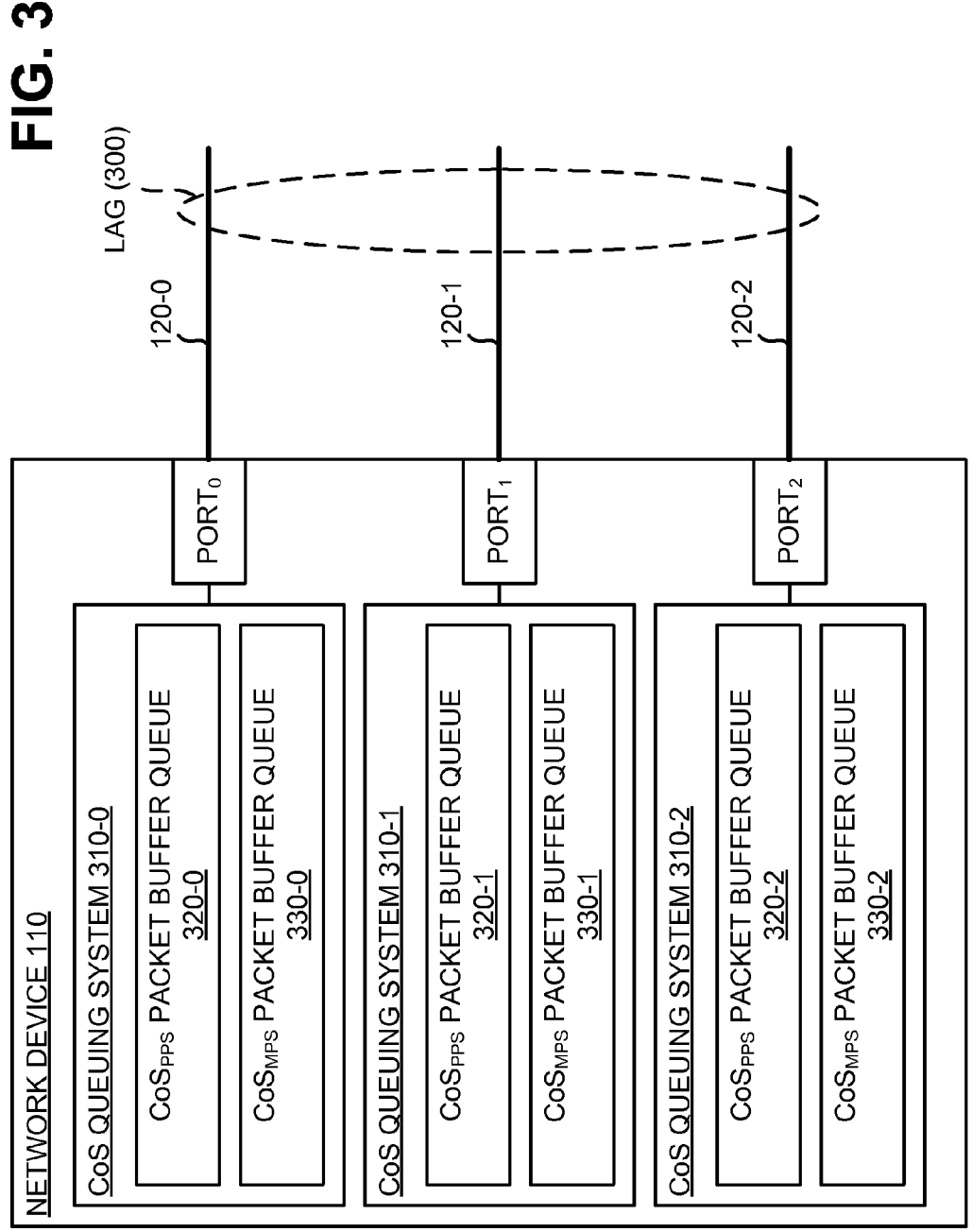
FIG. 3 is a diagram showing exemplary Class of Service (CoS) queues of the network device of FIG. 2.

FIG. 3 is a diagram showing exemplary Class of Service (CoS) queues of network device 110. It may be assumed for simplicity that network device 110 may define a CoS for point-to-point services and may define another CoS for multi-point services. In other implementations, there may be more than one CoS for point-to-point services and/or multi-point services. As shown in FIG. 3, network device 110 may include one or more CoS queues for each link of network device 110. For example, link 120-0 may be associated with one or more CoS queuing systems 310-0, link 120-1 may be associated with one or more CoS queuing systems 310-1, and link 120-2 may be associated with one or more CoS queuing systems 310-2. Each of CoS queuing systems 310-0, 310-1, and 310-2 (collectively referred to as CoS queuing systems 310) may include a separate packet queue allocated for each network service, or each CoS corresponding to a network service, to a corresponding link. For example, CoS queuing system 310-0 may include a $CoS_{PPS}$ packet queue 320-0 allocated for point-to-point services to link 120-0, and a $CoS_{MPS}$ packet queue 330-0 allocated for multi-point services to link 120-0. CoS queuing system 310-1 may include a $CoS_{PPS}$ packet queue 320-1 allocated for point-to-point services to link 120-1, and a $CoS_{MPS}$ packet queue 330-1 allocated for multi-point services to link 120-1. CoS queuing system 310-2 may include a $CoS_{PPS}$ packet queue 320-2 allocated for point-to-point services to link 120-2, and a $CoS_{MPS}$ packet queue 330-2 allocated for multi-point services to link 120-2.

$CoS_{PPS}$ packet buffer queues 320-0, 320-1, and 320-2 (collectively referred to as $CoS_{PPS}$ packet buffer queues 320) may be allocated bandwidth on a LAG 300 (e.g., defined by links 120-0, 120-1, and 120-2) so that point-to-point services may have a minimum guaranteed bandwidth. $CoS_{MPS}$ packet buffer queues 330-0, 330-1, and 330-2 (collectively referred to as $CoS_{MPS}$ packet buffer queues 330) may be allocated bandwidth on LAG 300 so that multi-point services may have a minimum guaranteed bandwidth.

In one implementation, a point-to-point connection may be identified by a VLAN value in a header, which may permit operation over native Ethernet networks. In other implementations, the point-to-point connection may be identified by any type of connection identifier (e.g., a generic Multiprotocol Label Switching (MPLS) label).

Although FIG. 3 shows exemplary components of network device 110, in other implementations, network device 110 may contain fewer, different, or additional components than depicted in FIG. 3. In still other implementations, one or more components of network device 110 may perform the tasks performed by one or more other components of network device 110.

Figure 4:
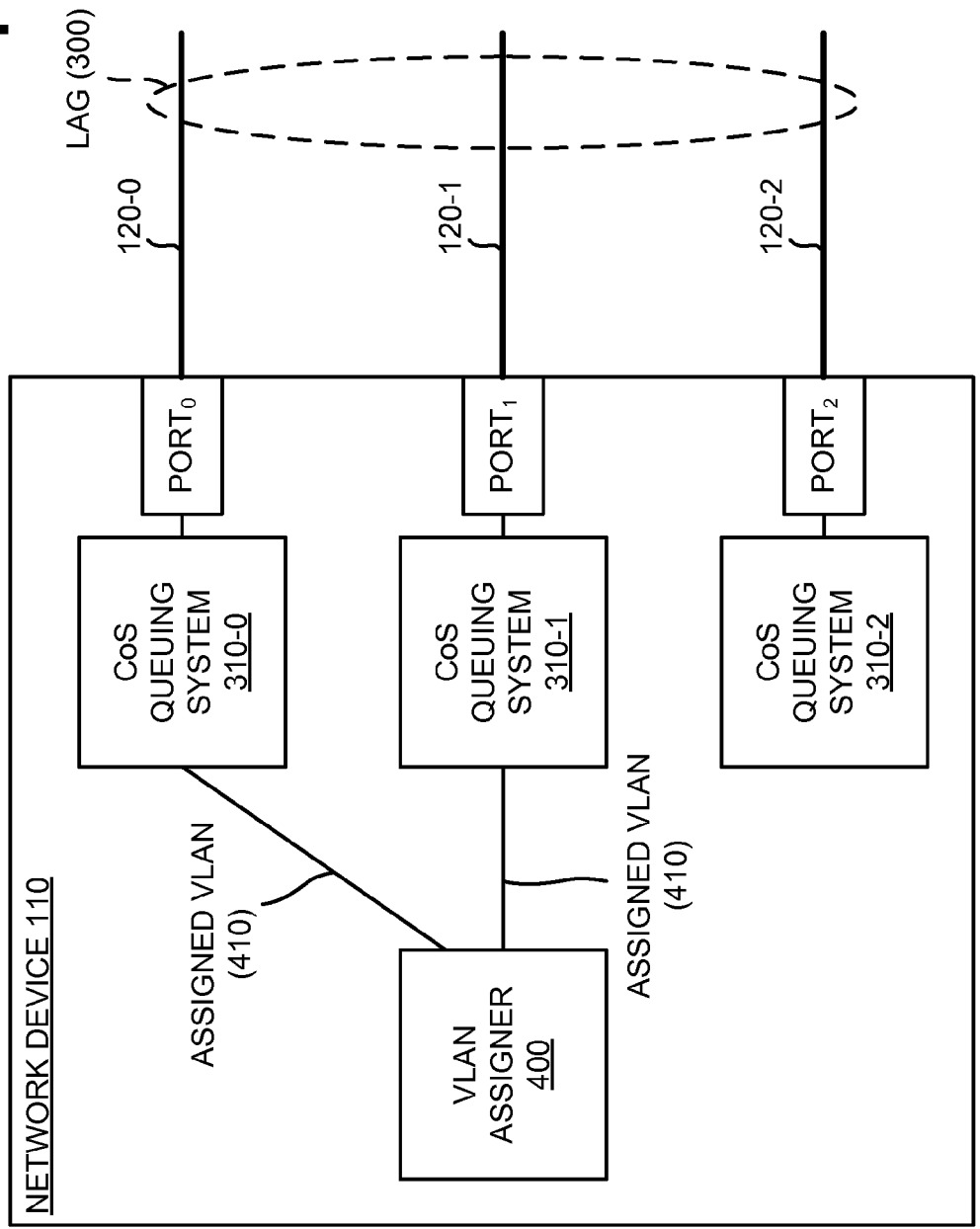
FIG. 4 is a diagram illustrating an exemplary VLAN assigner of the network device of FIG. 2.

FIG. 4 is a diagram illustrating an exemplary VLAN assigner 400 of network device 110. In one implementation, a VLAN may be assigned to one or more links (e.g., links 120) on a LAG (e.g., LAG 300). Typical equipment do not permit such an assignment, but rather assign a VLAN to a LAG and do not assign the VLAN to a specific link in the LAG. As shown in FIG. 4, VLAN assigner 400 may assign a VLAN to one or more links in a LAG for redundancy purposes. For example, VLAN assigner 400 may assign a VLAN 410 to link 120-0, via CoS queuing system 310-0 and $PORT_0$, and may also assign VLAN 410 to link 120-1, via CoS queuing system 310-1 and $PORT_1$. Traffic from a given VLAN (e.g., VLAN 410) may be transmitted on the links (e.g., links 120-0 and 120-1) in the LAG to which that VLAN is assigned. Although FIG. 4 shows VLAN 410 being assigned to two of the three links 120 depicted, in other implementations, VLAN 410 may be assigned to one or more links 120.

If VLAN assigner 400 assigns VLANs to a LAG (e.g., a LAG with a predetermined bandwidth), the VLANs may be admitted to a corresponding queue on the LAG so that the sum of active VLANs' bandwidths allocated to the queue may not exceed a bandwidth allocated for the queue multiplied by an oversubscription factor.

Although FIG. 4 shows exemplary components of network device 110, in other implementations, network device 110 may contain fewer, different, or additional components than depicted in FIG. 4. In still other implementations, one or more components of network device 110 may perform the tasks performed by one or more other components of network device 110.

Figure 5:
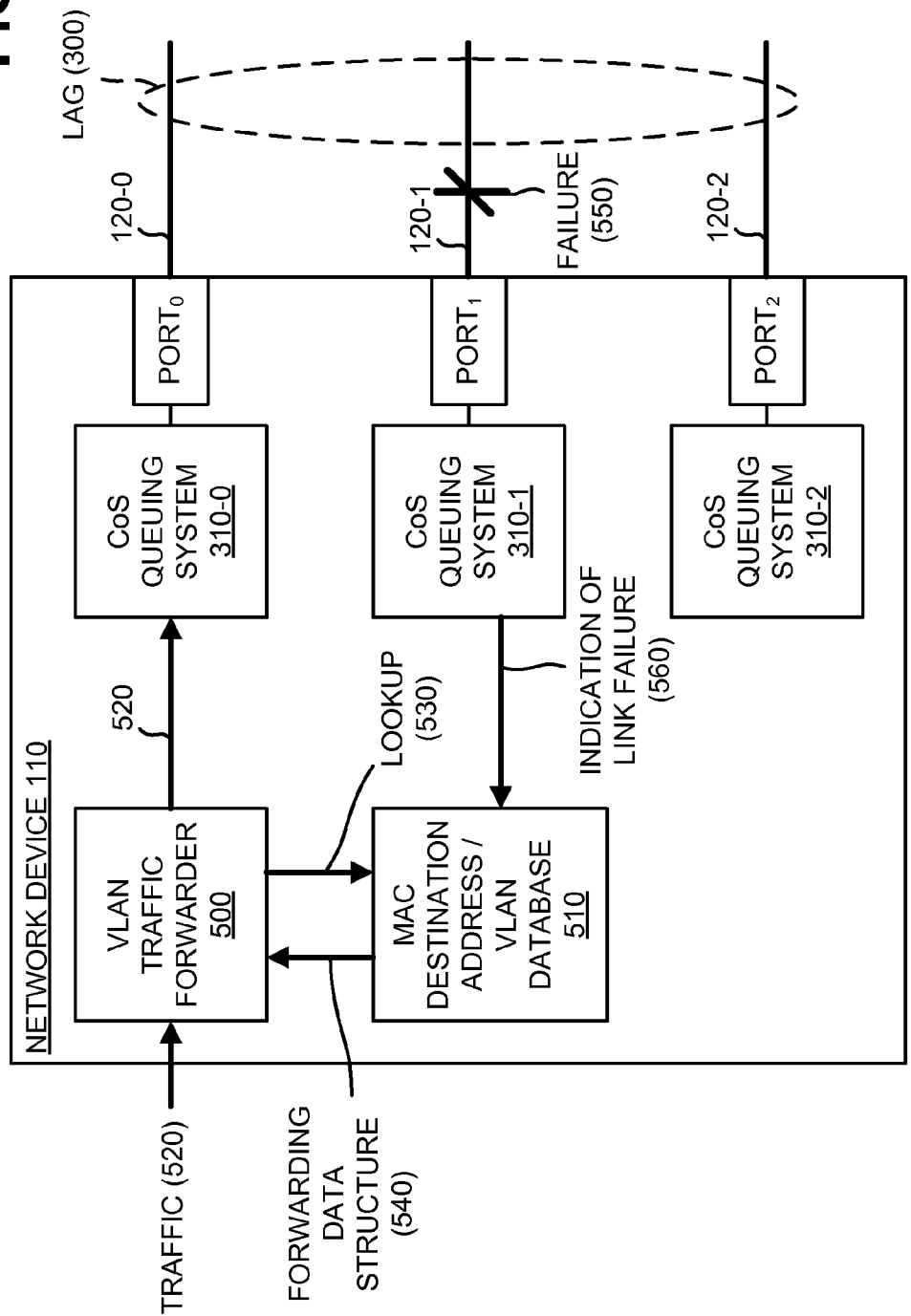
FIG. 5 is a diagram showing an exemplary VLAN traffic forwarder and a MAC destination address database of the network device of FIG. 2.

FIG. 5 is a diagram showing an exemplary VLAN traffic forwarder 500 and a MAC destination address/VLAN database 510 of network device 110. VLAN traffic forwarder 500 may direct traffic 520 arriving on a VLAN (not shown) to one or more links (e.g., links 120) in a LAG (e.g., LAG 300). In one implementation, VLAN traffic forwarder 500 may use a forwarding structure to determine to which links to send traffic 520, that includes the following data structure:

---

VLAN_type = (e.g., "0" for point-to-point VLAN, and "1" for multi-point VLAN)
Outgoing_Link_List_Pointer
Connection ID.

---

The outgoing link list may include the following data structure:

---

Outgoing_Link_List
{
    Number_Outgoing_Links;
    Link_List = (Link0_identifier, Link1_indentifier,
    ..., ink_n_identifier)
}.

---

MAC destination address/VLAN database 510 may include a static and/or dynamic storage device (e.g., memory 260-3) that may store information and instructions related to Ethernet MAC destination addresses and/or corresponding VLAN values and associated forwarding entities. There may be one database per input port 210 for point-to-point services that allows VLAN identifier to reuse across ports. In one implementation, MAC destination address/VLAN database 510 may include a Ternary content-addressable memory (CAM) (also known as associative memory, associative storage, and/or an associative array) that contains forwarding entries programmed with wildcards for Ethernet MAC destination addresses and/or corresponding VLAN values. In other implementations, MAC destination address/VLAN database 510 may include other types of forwarding entries that identify MAC destination addresses and/or corresponding VLAN values.

As further shown in FIG. 5, if traffic 520 (e.g., an Ethernet frame) arrives at network device 110 (e.g., on input port 210 of network device 110), VLAN traffic forwarder 500 may provide a lookup request 530 to MAC destination address/VLAN database 510 in order to determine an outgoing interface for traffic 520. Lookup request 530 may be used to determine a match (e.g., in MAC destination address/VLAN database 510) in which the VLAN may be a significant part. MAC destination address/VLAN database 510 may provide a forwarding data structure associated with the determined match, and VLAN traffic forwarder 500 may receive the forwarding data structure. In one exemplary implementation, VLAN traffic forwarder 500 may determine one or more LAG links to send traffic 520 based on the forwarding data structure (such as the data structure described above). In another implementation, traffic 520 arriving at network device 110 with a VLAN value matching the corresponding VLAN value associated with forwarding data structure 540 may be forwarded (by VLAN traffic forwarder 500) to a link associated with forwarding data structure 540.

The forwarding data structure associated with the VLAN may include a variety of information, such as the data structures described above. For example, for point-to-point VLANs, the VLAN type for the forwarding data structure may be appropriately set (e.g., to a "0" value). The Outgoing_Link_List_Pointer may be used to retrieve the Outgoing_Link_List for a VLAN associated with traffic 520. VLAN traffic forwarder 500 may use a hashing function to determine to which links to send traffic 520. In one example, the hashing function may be given by Link_Number=modulus (Hashing_parameter, Number_Outgoing_Links) Number_Outgoing_Links may be a value retrieved from the Outgoing_Link_List data structure described above. In one implementation, the hashing parameter (i.e., Hashing_parameter) may be computed based on IP header information for IP packets in the payload of traffic 520 (e.g., IP Source Address+IP Destination Address). The VLAN type may enable transmission of traffic from the same VLAN on the same link, if the link is operational. The Link_Number may be bounded by the size of Outgoing_Link_List, and may be used as an index in Link_List.

In one implementation, a selected link identifier may be retrieved by indexing in the Link_List, and may be determined by two components of a data structure (e.g., an Outgoing_Slot_Number and/or a Link_ID_On_Outgoing_Slot) provided in the forwarding data structure. The first part of the identifier (i.e., Outgoing_Slot_Number) may determine to which slot (e.g., of network device 110) to send a packet, and the second part of the identifier (i.e., Link_ID_On_Outgoing_Slot) may determine the specific link on which traffic 520 may be sent. Traffic 520 may sent to the outgoing slot along with the second part of the identifier (i.e., Link_ID_On_Outgoing_Slot). An egress packet processing block (e.g., of network device 110) may be provided on the outgoing slot, and may use the second part of the identifier to transmit traffic 520 to the correct link. Specifying the Outgoing_Link_List_Pointer in the forwarding structure described above, rather than the Link_List, may allow multiple forwarding entries to share the same Link_List. If traffic on the same VLAN is not to be load balanced on multiple links on which the VLAN may be pinned, the Link_List may include one value that may be provided in the forwarding structure rather than a Link_List pointer.

As further shown in FIG. 5, in one implementation and/or for redundancy purposes, traffic 520 on the same VLAN may be assigned to one or more links 120 of LAG 300. For example, traffic 520 on the same VLAN may be assigned to two links (e.g., links 120-0 and 120-1). The Number_Of_Outgoing_Links may be "2" if both links 120-0 and 120-1 are operational, and the Link_List may contain two elements. If both links 120-0 and 120-1 are operational, traffic 520 on the same VLAN may be sent on either link 120-0 and/or link 120-1, depending on the hashing parameter described above. If a link (e.g., link 120-1) in LAG 300 fails (as indicated by reference number 550), traffic 520 on the same VLAN may not be sent on link 120-1, and the affected Outgoing_Links_List parameter may be modified by removing link 120-1 from LAG 300 and by decreasing the number of links by one. An indication 560 of the link failure of link 120-1 may be provided to control unit 260, which, in turn, may modify the impacted data structure in MAC destination address/VLAN database 510 shown in FIG. 5 as a failure indication in database 510. Implementations may include various methods of failure notification and/or forwarding database updates.

In other implementations, a mechanism may be provided to update the forwarding structure and reduce the amount of packet loss upon link failure by pinning VLAN traffic to one primary link when that link is operational, and to a redundant link if the primary link fails. In the exemplary case of one primary link and one redundant link, Outgoing_Link_List may be designed as follows:

```
Outgoing_Link_List
    {
    Active_Bit_Indication = [Primary_Active_Bit,
    Redundant_Active_Bit]
    Primary_Link_Identifier
    Redundant_Link_Identifier
    }.
```

If the primary link is active, Primary_Link_Bit may be set to a value of "1" and Redundant_Active_Bit may be set to a value of "0." If the primary link fails and the redundant link is still operational, Primary_Active_Bit may be set to a value of "0" and Redundant_Active_Bit may be set to a value of "1." A change in the status of a link may translate to such a two-bit setting. If the forwarding structure described above is shared by more than one VLAN, the two-bit setting may cause the traffic from such VLANs to be rerouted around the failed link. If the primary link is active, the traffic of the VLANs may be forwarded on the primary link. If the primary link fails, the traffic of the VLANs may be forwarded on the redundant link. Link_Identifier may include the same scheme described above, and the forwarding procedure may be the same as outlined above if the outgoing link is identified.

In still other implementations, the primary link/redundant link scheme may be expanded if more redundancy is desired, depending on the amount of underutilized bandwidth that may be desired, although the underutilized bandwidth may be compensated for by using oversubscription. Furthermore, the forwarding structure described above may be applied if the primary and redundant VLAN paths are on different LAGs (e.g., providing for link and network device protection if the primary and redundant paths on the network device lead to different neighboring network devices).

Although FIG. 5 shows exemplary components of network device 110, in other implementations, network device 110 may contain fewer, different, or additional components than depicted in FIG. 5. In still other implementations, one or more components of network device 110 may perform the tasks performed by one or more other components of network device 110. In further implementations, network device 110 may include the features set forth in co-pending application Ser. No. 11/949,249, entitled "BANDWIDTH ADMISSION CONTROL ON LINK AGGREGATION GROUPS," filed on the same date herewith, the disclosure of which is incorporated by reference herein in its entirety.

Figure 6:
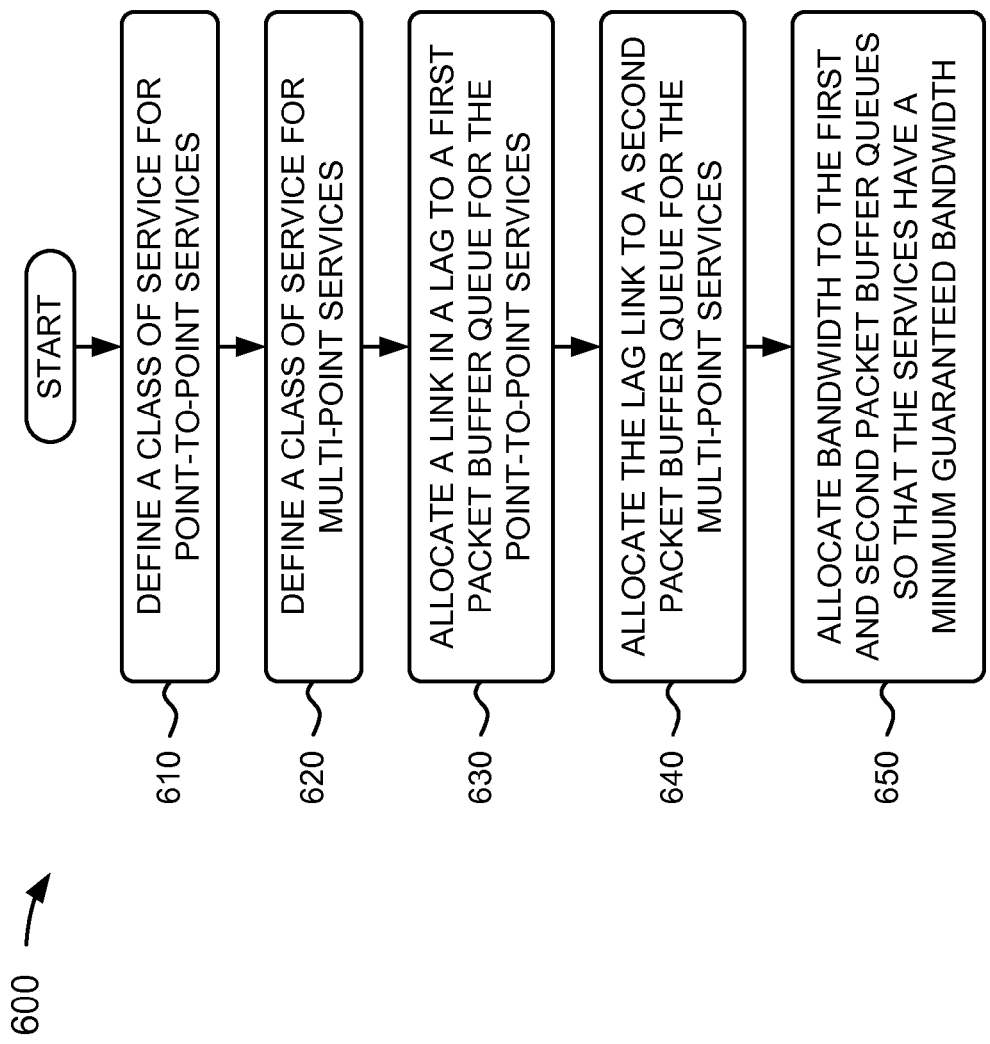
Figure 7:
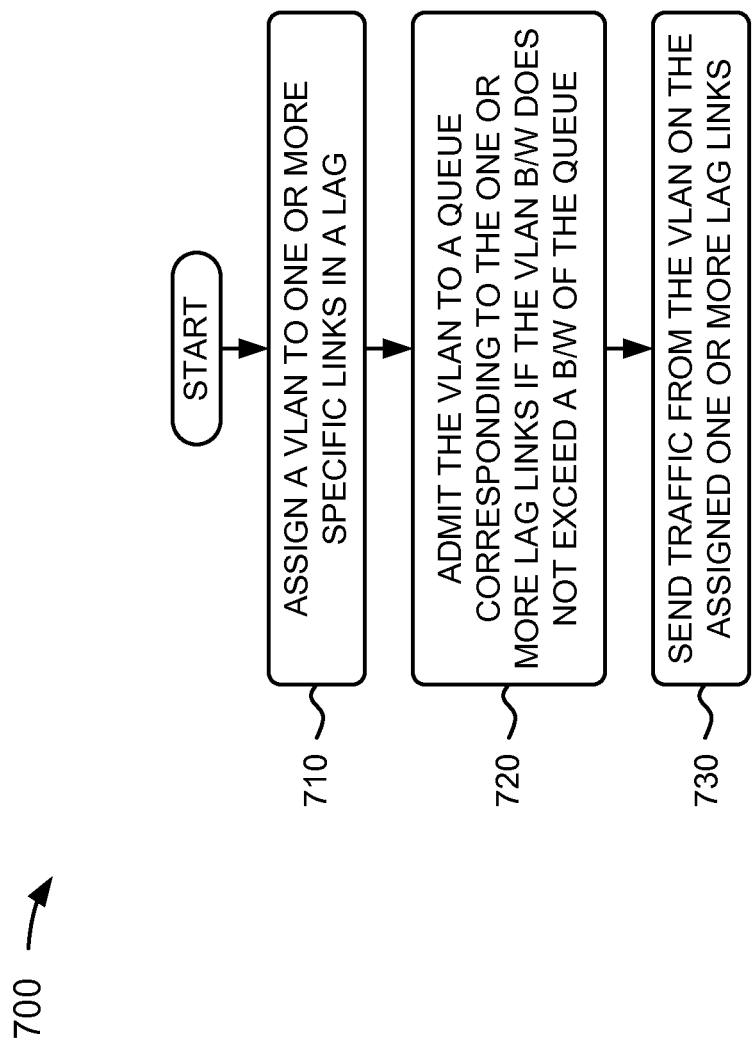

FIGS. 6-8 depict flowcharts of exemplary processes for a network (e.g., network 100) and/or a network device (e.g., network device 110). In one implementation, the processes of FIGS. 6-8 may be performed by hardware and/or software components of a device of a network or may be performed by hardware and/or software components of a device external to the network but communicating with the network. In other implementations, the processes of FIGS. 6-8 may be performed by hardware and/or software components of network device 110 (e.g., by control unit 260) and/or one or more devices in network 100.

FIG. 6 depicts a flowchart of an exemplary process 600 for allocating a LAG link to a packet buffer queue for point-to-point services, and to another packet buffer queue for multi-point services. As shown in FIG. 6, process 600 may begin by defining a class of service for point-to-point services (block 610), and defining a class of service for multi-point services (block 620). For example, in one implementation described above in connection with FIG. 3, network device 110 may define a class of service (CoS) for point-to-point services and may define another CoS for multi-point services.

As further shown in FIG. 6, a link in a LAG may be allocated to a first packet buffer queue for the point-to-point services (block 630). For example, in one implementation described above in connection with FIG. 3, CoS queuing system 310-0 may include $CoS_{PPS}$ packet buffer queue 320-0 allocated for point-to-point services to link 120-0, CoS queuing system 310-1 may include $CoS_{PPS}$ packet buffer queue 320-1 allocated for point-to-point services to link 120-1, and CoS queuing system 310-2 may include a $CoS_{PPS}$ packet buffer queue 320-2 allocated for point-to-point services to link 120-2.

The LAG link may be allocated to a second packet buffer queue for the multi-point services (block 640). For example, in one implementation described above in connection with FIG. 3, CoS queuing system 310-0 may include $CoS_{MPS}$ packet buffer queue 330-0 allocated for multi-point services to link 120-0, CoS queuing system 310-1 may include $CoS_{MPS}$ packet buffer queue 330-1 allocated for multi-point services to link 120-1, and CoS queuing system 310-2 may include $CoS_{MPS}$ packet buffer queue 330-2 allocated for multi-point services to link 120-2.

As further shown in FIG. 6, a bandwidth may be allocated to the first and second packet buffer queues so that the point-to-point and multi-point services have a minimum guaranteed bandwidth (block 650). For example, in one implementation described above in connection with FIG. 3, $CoS_{PPS}$ packet buffer queues 320-0, 320-1, and 320-2 may be allocated bandwidth on LAG 300 (e.g., defined by links 120-0, 120-1, and 120-2) so that point-to-point services may have a minimum guaranteed bandwidth. $CoS_{MPS}$ packet buffer queues 330-0, 330-1, and 330-2 may be allocated bandwidth on LAG 300 so that multi-point services may have a minimum guaranteed bandwidth.

FIG. 7 depicts a flowchart of an exemplary process 700 for assigning a VLAN to one or more links of a LAG. As shown in FIG. 7, process 700 may begin by assigning a VLAN to one or more specific links in a LAG (block 710). For example, in one implementation described above in connection with FIG. 4, VLAN assigner 400 may assign a VLAN to one or more links in a LAG for redundancy purposes. In one example, VLAN assigner 400 may assign VLAN 410 to link 120-0, via CoS queuing system 310-0 and $PORT_0$, and may also assign VLAN 410 to link 120-1, via CoS queuing system 310-1 and $PORT_1$.

As further shown in FIG. 7, the VLAN may be admitted to a queue corresponding to the assigned one or more LAG links if the VLAN bandwidth does not exceed a bandwidth of the queue (block 720). For example, in one implementation described above in connection with FIG. 4, if VLAN assigner 400 assigns VLANs to a LAG with a predetermined bandwidth, the VLANs may be admitted to a corresponding queue on the LAG so that the sum of active VLANs' bandwidths allocated to the queue may not exceed a queue bandwidth multiplied by an oversubscription factor.

Traffic may be sent from the VLAN on the assigned one or more LAG links (block 730). For example, in one implementation described above in connection with FIG. 4, traffic from a given VLAN (e.g., VLAN 410) may be transmitted on the links (e.g., links 120-0 and 120-1) in the LAG to which that VLAN is assigned. In other implementations, where it may be necessary to transmit traffic from a same VLAN on one link, traffic from a given VLAN (e.g., VLAN 410) may be transmitted on the links (e.g., links 120-0 or 120-1) in a LAG to which VLAN is assigned, where one link may be active (e.g., link 120-0) and the other link may be on standby (e.g., link 120-1).

FIG. 8 depicts a flowchart of an exemplary process 800 for forwarding traffic on one or more links of a LAG based on a forwarding data structure. As shown in FIG. 8, process 800 may begin by receiving traffic (block 810), and looking up a MAC destination address and a corresponding VLAN value to determine a match where the VLAN is a significant part (block 820). For example, in one implementation described above in connection with FIG. 5, VLAN traffic forwarder 500 may direct traffic 520 arriving on a VLAN (not shown) to one or more links (e.g., links 120) in a LAG (e.g., LAG 300). VLAN traffic forwarder 500 may provide lookup request 530 to MAC destination address/VLAN database 510 in order to determine an outgoing interface for traffic 520.

As further shown in FIG. 8, a forwarding data structure associated with the match may be retrieved (block 830), and one or more LAG links to send the traffic may be determined based on the forwarding data structure (block 840). For example, in one implementation described above in connection with FIG. 5, the lookup in MAC destination address/VLAN database 510 may provide a forwarding data structure (e.g., forwarding data structure 540) associated with the determined match, and VLAN traffic forwarder 500 may receive the forwarding data structure. VLAN traffic forwarder 500 may determine one or more LAG links to send traffic 520 based on the forwarding data structure (i.e., forwarding data structure 540).

If no link failure occurs in the LAG (block 850—NO), then the traffic may be sent on the determined one or more LAG links (block 860). For example, in one implementation described above in connection with FIG. 5, traffic 520 on the same VLAN may be assigned to one or more links 120 of LAG 300. In one example, traffic 520 on the same VLAN may be assigned to two links (e.g., links 120-0 and 120-1). If both links 120-0 and 120-1 are operational, traffic 520 on the same VLAN may be sent on either link 120-0 and/or link 120-1. In another example, traffic 520 arriving at network device 110 with a VLAN value matching the corresponding VLAN value associated with forwarding data structure 540 may be forwarded (by VLAN traffic forwarder 500) to a link associated with forwarding data structure 540.

As further shown in FIG. 8, if a link failure occurs in the LAG (block 850—YES), then the failed link may be removed from the LAG (block 870) and the traffic may sent on the remaining LAG links (block 880). For example, in one implementation described above in connection with FIG. 5, if a link (e.g., link 120-1) in LAG 300 fails (as indicated by reference number 550), traffic 520 on the same VLAN may not be sent on link 120-1, and the affected Outgoing_Links_List parameter may be modified by removing link 120-1 from LAG 300 and by decreasing the number of links by one. An indication 560 of the link failure of link 120-1 may be provided to MAC destination address/VLAN database 510 for updating purposes. For traffic on the same VLAN to follow the same link, the hashing_parameter may only include the VLAN ID. In other implementations, to ensure that the VLAN traffic follows the same link but without overloading the link, a VLAN may be admitted to a queue on a link in a LAG and to a queue on a redundant link in the LAG, with one link being a primary link and the other link being a standby link. A data structure that enables such implementation is described above.

Systems and methods described herein may guarantee SLAs for point-to-point services in the presence of multi-point services on a LAG. In one implementation, the systems and methods may ensure that point-to-point services may share a LAG with multi-point traffic while still guaranteeing that the point-to-point services have a predictable behavior. In other implementations, the systems and methods may allocate corresponding point-to-point connections to queues on a link of the LAG via a management mechanism and/or via signaling.

The foregoing description provides illustration and description, but is not intended to be exhaustive or to limit the invention to the precise form disclosed. Modifications and variations are possible in light of the above teachings or may be acquired from practice of the invention. For example, a point-to-point VLAN may carry traffic from multiple classes of service. The VLAN may be admitted to a corresponding CoS queue on a LAG link. If the traffic from the VLAN for all CoSs is to follow the same link, a constraint may include that the VLAN be admitted to the same link for all CoSs it carries for that VLAN to assigned to the link.

Furthermore, while series of acts have been described with regard to the flowcharts of FIGS. 6-8, the order of the acts may differ in other implementations. Further, non-dependent acts may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   allocating, by the network device, a guaranteed bandwidth to a first queue and a second queue,
   the first queue being associated with point-to-point services, and
   the second queue being associated with multi-point services;
   assigning, by the network device, a virtual local area network (VLAN) to a link in a link aggregation group (LAG),
   the link in the LAG being associated with the first queue and the second queue; and
   associating, by the network device, the VLAN to one of the first queue or the second queue, corresponding to the assigned link in the LAG, when a bandwidth of the VLAN does not exceed a bandwidth of the one of the first queue or the second queue.

2. The method of claim 1, further comprising:
   assigning the VLAN to another link in the LAG,
   the other link in the LAG being associated with another first queue and another second queue; and
   transmitting traffic from the VLAN on the assigned link and the assigned other link in the LAG.

3. The method of claim 1, further comprising:
   retrieving a forwarding data structure based on a media access control (MAC) address destination and a corresponding VLAN value associated with traffic received at the network device; and
   determining, based on the forwarding data structure, one or more links in the LAG for transmitting the traffic from the network device.

4. The method of claim 3, further comprising:
   detecting a failure of one of the one or more links in the LAG;
   removing the failed one of the one or more links from the LAG to obtain a group of remaining links; and
   transmitting the traffic on the group of remaining links.

5. The method of claim 1, further comprising:
   assigning the VLAN to another link in the LAG,
   the other link in the LAG being associated with another first queue and another second queue;
   determining whether the link in the LAG is active;
   transmitting traffic from the VLAN on the link in the LAG when the link in the LAG is active; and
   transmitting the traffic from the VLAN on the other link in the LAG when the link in the LAG is inactive.

6. The method of claim 5, further comprising:
   detecting a link failure of the link in the LAG; and
   determining that the link in the LAG is inactive based on detecting the link failure.

7. The method of claim 1, further comprising:
assigning the VLAN to a link in another LAG,
the link in the other LAG being associated with another first queue and another buffer queue;
determining whether the link in the LAG is active;
transmitting traffic from the VLAN on the link in the LAG when the link in the LAG is active; and
transmitting the traffic from the VLAN on the link in the other LAG when the link in the LAG is inactive.

8. A network device comprising:
a processor to:
allocate a guaranteed bandwidth to a first queue and a second queue,
the first queue being associated with point-to-point services, and
the second queue being associated with multi-point services,
assign a virtual local area network (VLAN) to a link in a link aggregation group (LAG),
the link in the LAG being associated with the first queue and the second queue, and
associate the VLAN to one of the first queue or the second queue, corresponding to the assigned link in the LAG, when a bandwidth of the VLAN does not exceed a bandwidth of the one of the first queue or the second queue.

9. The network device of claim 8, where the processor is further to:
assign the VLAN to another link in the LAG,
the other link in the LAG being associated with another first queue and another second queue, and
transmit traffic from the VLAN on the link and the other link in the LAG.

10. The network device of claim 8, where the processor is further to:
retrieve a forwarding data structure based on a media access control (MAC) address destination and a corresponding VLAN value associated with traffic received at the network device, and
determine, based on the forwarding data structure, one or more links in the LAG for transmitting the traffic from the network device.

11. The network device of claim 10, where the processor is further to:
detect a failure of one of the one or more links in the LAG,
remove the failed one of the one or more links from the LAG to obtain a group of remaining links, and
transmit the traffic on the group of remaining links.

12. The network device of claim 8, where the processor is further to:
assign the VLAN to another link in the LAG,
the other link in the LAG being associated with another first queue and another second queue,
determine whether the assigned link in the LAG is active,
transmit traffic from the VLAN on the link in the LAG when the link in the LAG is active, and
transmit the traffic from the VLAN on the other link in the LAG when the link in the LAG is inactive.

13. The network device of claim 12, where the processor is further to:
detect a link failure of the link in the LAG, and
determine that the link in the LAG is inactive based on detecting the link failure.

14. The network device of claim 8, where the processor is further to:
assign the VLAN to a link in another LAG,
the link in the other LAG being associated with another first queue and another second queue,
determine whether the link in the LAG is active,
transmit traffic from the VLAN on the link in the LAG when the link in the LAG is active, and
transmit the traffic from the VLAN on the link in the other LAG when the link in the LAG is inactive.

15. A non-transitory computer-readable memory device storing instructions, the instructions comprising:
one or more instructions which, when executed by one or more processors, cause the one or more processors to:
allocate a guaranteed bandwidth to a first queue and a second queue,
the first queue being associated with point-to-point services, and
the second queue being associated with multi-point services;
assign a virtual local area network (VLAN) to a link in a link aggregation group (LAG),
the link in the LAG being associated with the first queue and the second queue; and
associate the VLAN to one of the first queue or the second queue, corresponding to the assigned link in the LAG, when a bandwidth of the VLAN does not exceed a bandwidth of the one of the first queue or the second queue.

16. The non-transitory computer-readable memory device of claim 15, where the instructions further comprise:
one or more instructions to assign the VLAN to another link in the LAG,
the other link in the LAG being associated with another first queue and another second queue; and
one or more instructions to transmit traffic from the VLAN on the link and the other link in the LAG.

17. The non-transitory computer-readable memory device of claim 15, where the instructions further comprise:
one or more instructions to retrieve a forwarding data structure based on a media access control (MAC) address destination and a corresponding VLAN value associated with traffic received at the network device; and
one or more instructions to determine, based on the forwarding data structure, one or more links in the LAG for transmitting the traffic from the network device.

18. The non-transitory computer-readable memory device of claim 15, where the instructions further comprise:
one or more instructions to assign the VLAN to another link in the LAG,
the other link in the LAG being associated with another first queue and another second queue;
one or more instructions to determine whether the link in the LAG is active;
one or more instructions to transmit traffic from the VLAN on the link in the LAG when the link in the LAG is active; and
one or more instructions to transmit the traffic from the VLAN on the other link in the LAG when the link in the LAG is inactive.

19. The non-transitory computer-readable memory device of claim 18, where the instructions further comprise:
one or more instructions to detect a link failure of the link in the LAG; and
one or more instructions to determine that the link in the LAG is inactive based on detecting the link failure.

20. The non-transitory computer-readable memory device of claim 15, where the instructions further comprise:
one or more instructions to assign the VLAN to a link in another LAG,
the link in the other LAG being associated with another first queue and another second queue;
one or more instructions to determine whether the link in the LAG is active;
one or more instructions to transmit traffic from the VLAN on the link in the LAG when the link in the LAG is active; and
one or more instructions to transmit the traffic from the VLAN on the link in the other LAG when the link in the LAG is inactive.

* * * * *